(12) United States Patent
Chen

(10) Patent No.: US 11,852,936 B2
(45) Date of Patent: Dec. 26, 2023

(54) LIQUID CRYSTAL DISPLAY PANEL

(71) Applicant: TCL CHINA STAR OPTOELECTRONICS TECHNOLOGY CO., LTD., Guangdong (CN)

(72) Inventor: Yani Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 674 days.

(21) Appl. No.: 16/969,430

(22) PCT Filed: Apr. 21, 2020

(86) PCT No.: PCT/CN2020/085931
§ 371 (c)(1),
(2) Date: Aug. 12, 2020

(87) PCT Pub. No.: WO2021/179403
PCT Pub. Date: Sep. 16, 2021

(65) Prior Publication Data
US 2023/0161206 A1    May 25, 2023

(30) Foreign Application Priority Data
Mar. 9, 2020   (CN) .......................... 202010157805.2

(51) Int. Cl.
*G02F 1/1362* (2006.01)
*G02F 1/1335* (2006.01)

(52) U.S. Cl.
CPC .. *G02F 1/136286* (2013.01); *G02F 1/133512* (2013.01)

(58) Field of Classification Search
CPC ...................................................... G02F 1/1362
See application file for complete search history.

(56) References Cited

U.S. PATENT DOCUMENTS

| | | | |
|---|---|---|---|
| 2002/0131003 A1* | 9/2002 | Matsumoto | ........... G02F 1/1345 |
| | | | 349/139 |
| 2006/0215071 A1 | 9/2006 | Shin et al. | |
| 2016/0261859 A1* | 9/2016 | Murao | .................. G02F 1/1347 |

(Continued)

FOREIGN PATENT DOCUMENTS

| CN | 1837936 A | 9/2006 |
|---|---|---|
| CN | 101625493 A | 1/2010 |

(Continued)

*Primary Examiner* — Sang V Nguyen
(74) *Attorney, Agent, or Firm* — PV IP PC; Wei Te Chung; Zhigang Ma

(57) ABSTRACT

A liquid crystal display panel includes a color filter substrate, an array substrate, and a liquid crystal layer. The array substrate includes a plurality of data lines and a plurality of data line black matrix less (DBS) electrodes disposed above the data lines. The DBS electrodes include at least one slit-shaped opening disposed at intervals. It may solve the problem that the data line and the DBS electrode always keep overlapping in the pixel structure of the prior art, resulting in a high parasitic capacitance of the data line, which is beneficial to the application of the DBS electrode in high-frequency and large-sized display panels.

18 Claims, 3 Drawing Sheets

(56) References Cited

U.S. PATENT DOCUMENTS

2018/0164647 A1    6/2018  Du
2021/0173271 A1*  6/2021  Long .................. G02F 1/13624

FOREIGN PATENT DOCUMENTS

| CN | 201788341 | U | 4/2011 |
|---|---|---|---|
| CN | 104516167 | A | 4/2015 |
| CN | 105445993 | * | 3/2016 |
| CN | 105445993 | A | 3/2016 |
| CN | 106226961 | A | 12/2016 |
| CN | 106648234 | A | 5/2017 |
| KR | 20140034628 | A | 3/2014 |

* cited by examiner

LIQUID CRYSTAL DISPLAY PANEL

BACKGROUND OF INVENTION

Field of Invention

The present invention relates to the field of display technology, and more particularly, to a liquid crystal display panel.

Description of Prior Art

In a conventional pixel structure, a black matrix (BM) is usually disposed above data lines to shield light, thereby improving a contrast of a display panel. However, alignment accuracy of upper and lower substrates often deviates during manufacturing of the display panel, causing the black matrix to move left and right, which in turn causes data lines to leak light. Current pixel structure adopts data line BM-less (DBS) technology, which removes the black matrix above the data line, forms a DBS electrode above the data line, and makes the DBS electrode and the common electrode on the color filter substrate have a same electric potential, so corresponding liquid crystal molecules above the data line are always kept in an undeflected state, thereby functioning as a light shield. In addition, the DBS electrode and the data line are disposed on an array substrate, lessening deviations in alignment, and light leakage caused by movement of the black matrix can be prevented.

However, in the pixel structure, the DBS electrode is always overlapped with the data line, so parasitic capacitance of the data line is high, which limits its application in high-frequency and large-sized display panels.

SUMMARY OF INVENTION

In one embodiment, a liquid crystal display panel is provided to solve problem in the liquid crystal display panel of the prior art. The problem is that forming DBS electrode above the data line to shield light, the DBS electrode always coincides with the data line, resulting in a high parasitic capacitance of the data line, which in turn affects the technical problems of its application in high-frequency and large-sized display panels.

In one embodiment, a liquid crystal display panel comprises a color filter substrate, an array substrate disposed opposite to the color filter substrate, a liquid crystal layer interposed between the color filter substrate and the array substrate, a black matrix disposed on a side of the color filter substrate facing the array substrate, and a pixel electrode is disposed on the array substrate, wherein the DBS electrode and the pixel electrode are disposed on a same level layer. The array substrate comprises a plurality of data lines and a plurality of data line black matrix less (DBS) electrodes disposed above the data lines. The DBS electrode comprises at least one slit-shaped opening disposed at intervals. The black matrix covers the slit-shaped opening corresponding the black matrix.

In one embodiment, a width of the black matrix is greater than or equal to a width of the data line.

In one embodiment, at least one orthographic projection of the slit-shaped opening on the data line is located on the center line in an extending direction of the data line.

In one embodiment, the slit-shaped opening comprises a rectangular shape.

In one embodiment, a length of the slit-shaped opening ranges from 5 microns to 20 microns, and a width of the slit-shaped opening ranges from 2.5 microns to one-third of a width of the data line.

In one embodiment, a width of the DBS electrode is greater than a width of the data line.

In one embodiment, two adjacent DBS electrodes are connected by a bridge wire, and the DBS electrode and the bridge wire are disposed on a same level layer.

In one embodiment, the color filter substrate further comprises a common electrode, and the common electrode and the DBS electrode have a same electric potential.

In one embodiment, at least one orthographic projection of the slit-shaped opening on the data line is located on the center line in the extending direction of the data line.

In one embodiment, the slit-shaped opening comprises a rectangular shape.

In one embodiment, a length of the slit-shaped opening ranges from 5 microns to 20 microns, and the width of the slit-shaped opening ranges from 2.5 microns to one-third of the width of the data line.

In one embodiment, a width of the DBS electrode is greater than a width of the data line.

In one embodiment, two adjacent DBS electrodes are connected by a bridge wire, and the DBS electrode and the bridge wire are disposed on a same level layer.

In one embodiment, the color filter substrate further comprises a common electrode, and the common electrode and the DBS electrode have a same electric potential.

A liquid crystal display panel comprises a color filter substrate, an array substrate disposed opposite to the color filter substrate, and a liquid crystal layer interposed between the color filter substrate and the array substrate. The array substrate comprises a plurality of data lines and a plurality of data line black matrix less (DBS) electrodes disposed above the data lines. The DBS electrode comprises at least one slit-shaped opening disposed at intervals.

In one embodiment, a black matrix is disposed on a side of the color filter substrate facing the array substrate, and the black matrix covers the slit-shaped opening corresponding the black matrix.

In one embodiment, a width of the black matrix is greater than or equal to a width of the data line.

In one embodiment, at least one orthographic projection of the slit-shaped opening on the data line is located on a center line in an extending direction of the data line.

In one embodiment, the slit-shaped opening comprises a rectangular shape.

In one embodiment, wherein a length of the slit-shaped opening ranges from 5 microns to 20 microns, and the width of the slit-shaped opening ranges from 2.5 microns to one-third of the width of the data line.

In one embodiment, a width of the DBS electrode is greater than a width of the data line.

In one embodiment, a pixel electrode is disposed on the array substrate, and the DBS electrode and the pixel electrode are disposed on a same level layer.

In one embodiment, two adjacent DBS electrodes are connected by a bridge wire, and the DBS electrode and the bridge wire are disposed on a same level layer.

In one embodiment, the color filter substrate further comprises a common electrode, and the common electrode and the DBS electrode have a same electric potential.

By forming at least one slit-shaped opening on the DBS electrode above the data line, and keeping the black matrix above the data line to shield the slit-shaped opening, thereby solving the problem of data line the pixel structure, such as the parasitic capacitance of the data line is high due to the data line always overlapping the DBS electrode pixel structure of the prior art. Accordingly, it is beneficial to the application of the DBS electrode in high-frequency and large-sized display panels.

BRIEF DESCRIPTION OF DRAWINGS

In order to more clearly illustrate the technical solutions in the embodiments, the drawings described in the description of the embodiments are briefly described below. It is obvious that the drawings in the following description are only some embodiments of the present invention. Other drawings can also be obtained from those skilled persons in the art based on drawings without any creative effort.

DETAILED DESCRIPTION OF PREFERRED EMBODIMENTS

Figure 1:
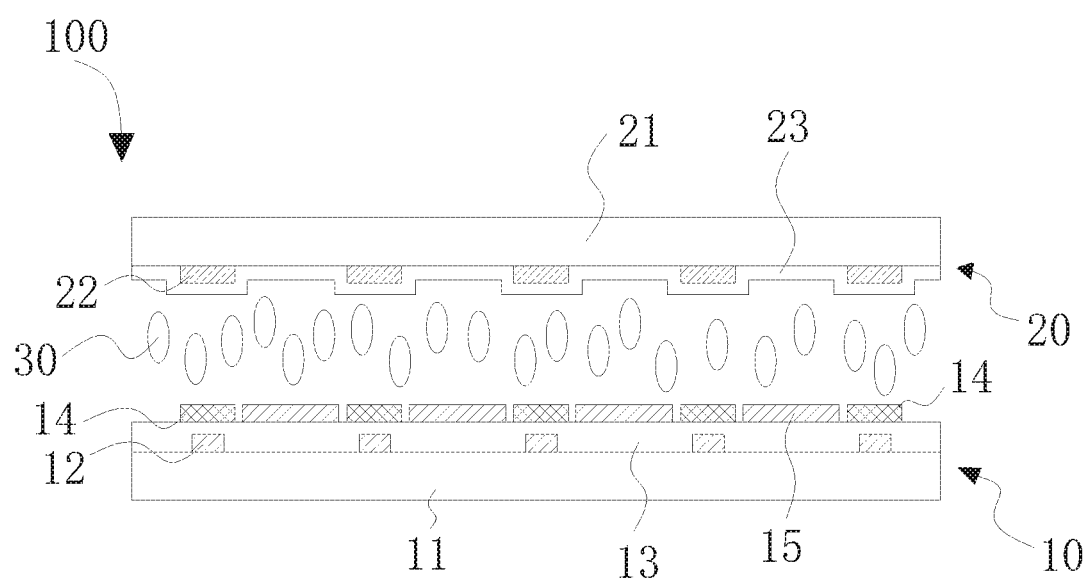
FIG. 1 is a schematic structural view of a liquid crystal display panel according to one embodiment of the present invention.

The technical solutions in the embodiments of the present application will be described clearly and completely in conjunction with the drawings in the embodiments of the present application. Obviously, the described embodiments are only a part of the embodiments of the present application, but not all the embodiments. Based on the embodiments in the present application, all other embodiments obtained by those skilled in the art without making creative work fall within the claimed scope of the present application.

In the description of this application, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise," etc. The positional relationship is based on the orientation or positional relationship shown in the drawings, and is only for the convenience of describing the application and simplifying the description, rather than indicating or implying that the device or element referred to must have a specific orientation, be constructed and operated in a specific orientation, Therefore, it cannot be understood as a limitation to this application. In addition, the terms "first"and "second" are used for description purposes only, and cannot be understood as indicating or implying relative importance or implicitly indicating the number of technical features indicated. Thus, features defined as "first" and "second" may explicitly or implicitly include one or more of the features. In the description of this application, the meaning of "plurality" is two or more, unless otherwise specifically limited.

In the description of this application, it should be noted that, unless otherwise clearly specified and limited, the terms "installation", "link", and "connection" should be understood in a broad sense, for example, it can be fixed connection or detachable Connected, or integrally connected; may be mechanical, electrical, or may communicate with each other; may be directly connected, or may be indirectly connected through an intermediary, may be the connection between two elements or the interaction of two elements relationship. Those of ordinary skill in the art can understand the specific meanings of the above terms in this application according to specific situations.

In this application, unless otherwise clearly specified and defined, the first feature "above" or "below" the second feature may include the first and second features in direct contact, or may include the first and second features Contact not directly but through another feature between them. Moreover, the first feature is "above", "over", and "on" the second feature includes that the first feature is directly above and obliquely above the second feature, or simply means that the first feature is higher in level than the second feature. The first feature is "below", "under", and "underneath" the second feature includes that the first feature is directly below and obliquely below the second feature, or simply means that the first feature is less horizontal than the second feature.

In this application, unless otherwise clearly specified and defined, the first feature "above" or "below" the second feature may include the first and second features in direct contact, or it may also include that the first and second features are not in direct contact but are in contact with another feature between them. Moreover, the first feature is "above", "on" and "over" the second feature includes that the first feature is directly above and obliquely above the second feature, or simply means that the first feature is higher in level than the second feature. The first feature is "below", "under" and "underneath" the second feature includes that the first feature is directly below and obliquely below the second feature, or simply means that the first feature is less horizontal than the second feature.

The following disclosure provides many different implementations or examples for implementing different structures of the present application. In order to simplify the disclosure of the present application, the components and settings of specific examples are described below. Of course, they are only examples, and the purpose is not to limit this application. In addition, the present application may repeat reference numerals and/or reference letters in different examples. Such repetition is for the purpose of simplicity and clarity, and does not itself indicate the relationship between the various embodiments and/or settings discussed. In addition, the present application provides examples of various specific processes and materials, but those of ordinary skill in the art may be aware of the application of other processes and/or the use of other materials.

Referring to FIG. 1, a liquid crystal display panel 100 is provided, and the liquid crystal display panel 100 includes a color filter substrate 20, an array substrate 10, and a liquid crystal layer 30. The color filter substrate 20 is disposed opposite to an array substrate 10. The liquid crystal layer 30 is interposed between the color filter substrate 20 and the array substrate 10. The array substrate 10 includes a plurality of data lines 12 and a plurality of data line black matrix less (DBS) electrodes disposed above the data lines 12.

A width of the DBS electrode 14 is greater than a width of the data line 12. Each DBS electrode 14 is correspondingly disposed above each of the data line 12.

Figure 2:
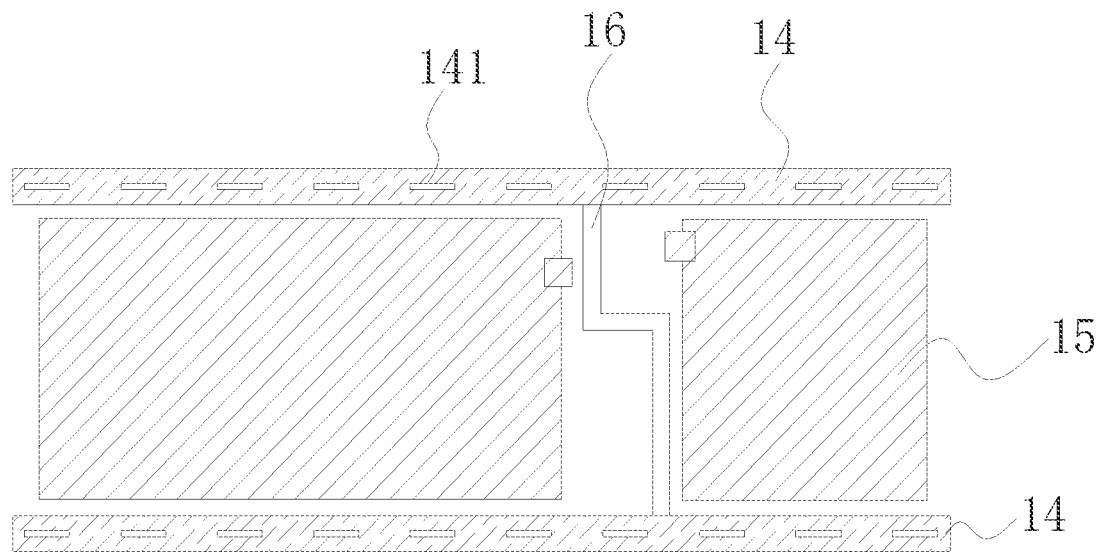
FIG. 2 is a schematic structural view of a DBS electrode and a pixel electrode according to one embodiment of the present invention.

Referring to FIG. 2, two adjacent DBS electrodes 14 are connected by a bridge wire 16, and the DBS electrode 14 and the common electrode 23 on the color filter substrate 20 have a same electric potential. Therefore, the liquid crystal molecules corresponding to the data line 12 are always kept in an undeflected state, thereby functioning as a light shield.

However, in the prior art, the DBS electrode completely coincides with the data line in the thickness direction, resulting in a high parasitic capacitance of the data line, which limits the application of the DBS electrode in high-frequency and large-sized panels. A slit-shaped opening 141 is formed on the DBS electrode 14 to solve the above-mentioned defects through changing the structure of the DBS electrode.

The DBS electrode 14 includes at least one slit-shaped opening 141 disposed at intervals. The slit-shaped opening 141 may reduce the overlapping area of the DBS electrode 14 and the data line 12, thereby reducing the parasitic capacitance of the data line 12.

The DBS electrode 14 is provided with the slit-shaped opening 141. In order to further enhance the shielding effect, a black matrix 22 is disposed on the side of the color filter substrate 20 facing the array substrate 10, and the black matrix 22 covers the slit-shaped opening 141 corresponding the black matrix 22, thereby making up for insufficient shielding caused by the slit-shaped opening 141.

When the color filter substrate 20 is aligned with the array substrate 10, the black matrix may move left and right due to deviation in alignment accuracy, so the width of the black matrix 22 may be set to be greater than or equal to the width of the data line 12.

Figure 3:
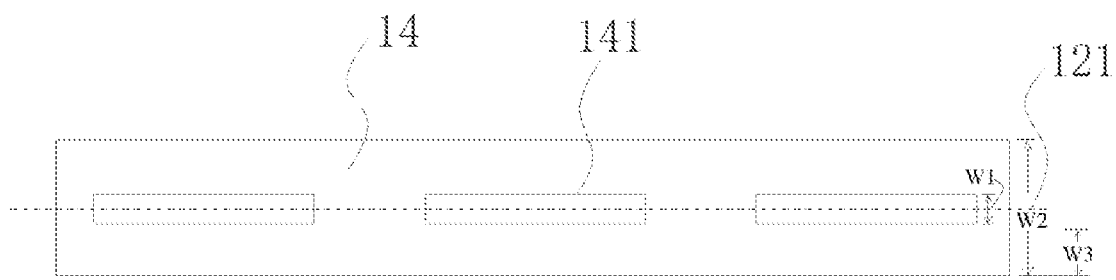
FIG. 3 is a schematic structural view of a DBS electrode according to one embodiment of the present invention.

Furthermore, referring to FIG. 3, due to limitation of the alignment accuracy of the black matrix 22, at least one orthographic projection of the slit-shaped opening 141 on the data line 12 is located on the center line 121 in the extending direction of the data line 12. Therefore, light leakage at the slit-shaped opening 141 is at the center of the data line, and the light leakage at this part is covered by the black matrix 22, and even if the alignment of the black matrix 22 shifts, the black matrix 22 may cover the slit-shaped opening 141.

The data line 12 and the DBS electrode 14 are both disposed on the array substrate 10, and the deviation of the alignment accuracy is less. Therefore, at least one of the slit-shaped openings 141 may be disposed at intervals on the centerline of the extending direction of the DBS electrode 14, the slit-shaped opening 141 is formed by forming a hole in the center of the DBS electrode 14.

The plurality of slit-shaped openings 141 may be formed at equal intervals, and a distance between two adjacent slit-shaped openings 141 depends on actual design needs, and is not limited herein.

The distance between two adjacent slit-shaped openings 141 may be zero. At this time, only one slit-shaped opening 141 is formed on the DBS electrode 14.

The slit-shaped opening 141 penetrates the upper and lower surfaces of the DBS electrode 14.

The extending direction (longitudinal direction) of the slit-shaped opening 141 is the same as the extending direction of the DBS electrode 14. The slit-shaped opening 141 is a closed-shaped opening to prevent the slit-shaped opening 141 from being formed at the edge of the DBS electrode, thereby ensuring the shielding ability of the edge of the DBS electrode 14 to compensate for the light leakage caused by the movement of the black matrix 22.

Figure 4:
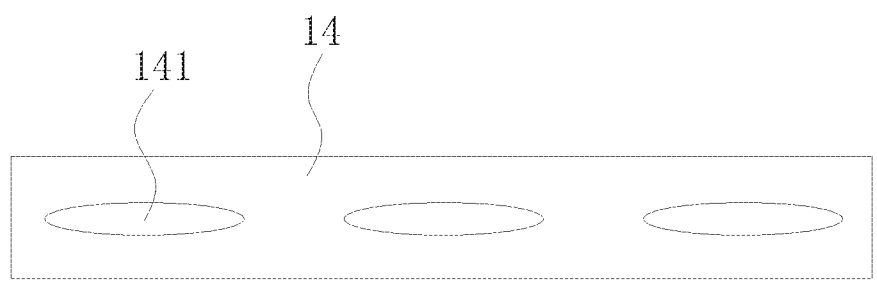
FIG. 4 is a schematic structural view of a DBS electrode according to another embodiment of the present invention.

In one embodiment, the slit-shaped opening 141 is a rectangular shape. In other embodiments, as shown in FIG. 4, the slit-shaped opening 141 is an elliptical shape, and may also have other shapes, such as a triangle, a circle, and a square.

The width of the slit-shaped opening 141 cannot be too wide, so it may avoid light leakage at the edge of the DBS electrode. The specific size of the slit-shaped opening 141 depends on the actual pixel size and the width of the data line.

When the slit-shaped opening 141 is a rectangular shape, the length of the slit-shaped opening 141 ranges from 5 microns to 20 microns. The width of the slit-shaped opening ranges from 2.5 microns to one-third of the width of the data line. Specifically, in this embodiment, a length of the slit-shaped opening is 10 microns and a width of the slit-shaped opening is 3 microns.

When the slit-shaped opening 141 is a triangular shape, the height of the triangle may be the same as the length of the rectangle, and the width of the triangle may be the same as the width of the rectangle. An opening area of the triangular shape is not as large as that of the rectangular shape and the degree of reducing the parasitic capacitance is not as obvious as that of the rectangular shape, but the contrast ratio is higher than that of the rectangular opening.

The array substrate 10 is further provided with a pixel electrode 15. The DBS electrode 14 and the pixel electrode 15 are disposed on a same level layer, and the pixel electrode 15 and the DBS electrode 14 may be formed through the same patterning process.

Two adjacent DBS electrodes 14 may be connected by a bridge wire 16. When the DBS electrodes 14 and the bridge wire 16 are disposed on different level layers, the bridge wire 16 may connect the two DBS electrodes 14 through via holes. When the DBS electrode and the bridge wire 16 are disposed on the same level layer, the bridge wire 16 may directly connect the two DBS electrodes.

In this embodiment, the array substrate 10 includes a first substrate 11, a data line 12 disposed on the first substrate 11, a source and a drain disposed on the same level layer as the data line 12 (not shown), an insulating layer 13 disposed on the data line 12, and a plurality of DBS electrodes 14 and pixel electrodes 15 are disposed on the insulating layer and the same level layer. The array substrate 10 further includes a gate, a scanning line, an active layer, etc., which may refer to the prior art, and will not be described herein.

When the DBS electrode 14, the bridge wire 16, and the pixel electrode 15 are disposed on the same level layer, the pixel electrode 15 includes a main pixel electrode and a sub-pixel electrode. The main pixel electrode and the sub-pixel electrode are spaced apart. The bridge wire 16 is disposed between the main pixel electrode and the sub-pixel electrode.

The scan line is disposed between the main pixel electrode and the sub-pixel electrode, and both the main pixel electrode and the sub-pixel electrode are connected to the scan line corresponding to the sub-pixels in the column.

The bridge wire 16 runs along the edge of the scan line, thereby reducing signal interference between the signal lines.

The pixel electrode 15 may be made of indium tin oxide.

The color filter substrate 20 includes a second substrate 21, a black matrix 22 disposed on a side of the second substrate 21 facing the array substrate 10, and a common electrode 23 disposed on the black matrix 22.

The array substrate 10 may be a color filter on array (COA), which is a color filter integrated on the array substrate. The array substrate 10 further includes a color filter layer (not shown), and the color filter layer is disposed above the data line 12.

By forming at least one slit-shaped opening 141 on the DBS electrode 14 above the data line 12, and keeping the black matrix 22 above the data line 12 to shield the slit-shaped opening 141, thereby solving the problem of data line the pixel structure, such as the parasitic capacitance of the data line is high due to the data line always overlapping the DBS electrode pixel structure of the prior art. In this embodiment, by analog design, the parasitic capacitance of the data line in a single pixel may be reduced by 30% compared with the prior art, which is beneficial to the application of the DBS electrode in high-frequency and large-sized display panels.

In the above embodiments, the description of each embodiment has its own emphasis. For a part that is not detailed in an embodiment, please see related descriptions in other embodiments.

In the above, a liquid crystal display panel of the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A liquid crystal display panel, comprising:
   a color filter substrate;
   an array substrate disposed opposite to the color filter substrate, wherein the array substrate comprises a plurality of data lines and a plurality of data line black matrix less (DBS) electrodes disposed above the data lines;
   a liquid crystal layer interposed between the color filter substrate and the array substrate, wherein each of the plurality of DBS electrodes comprises at least one slit-shaped opening disposed at intervals along a length side of the DBS electrode and extending along a wide side of the DBS electrode, wherein the slit-shaped opening is a closed-shaped opening comprising a top wall, a bottom wall, and two opposite sidewalls, the top wall is distanced from a top surface of the DBS electrode, and the bottom wall is distanced from a bottom surface of the DBS electrode;
   a black matrix disposed on a side of the color filter substrate facing the array substrate, wherein the black matrix covers the slit-shaped opening corresponding the black matrix; and
   a pixel electrode disposed on the array substrate, wherein the DBS electrode and the pixel electrode are disposed on a same level layer.

2. The liquid crystal display panel according to claim 1, wherein a width of the black matrix is greater than or equal to a width of the data line.

3. The liquid crystal display panel according to claim 1, wherein at least one orthographic projection of at least one the slit-shaped opening on the data line is located on a center line in an extending direction of the data line.

4. The liquid crystal display panel according to claim 1, wherein the slit-shaped opening comprises a rectangular shape.

5. The liquid crystal display panel according to claim 4, wherein a length of the slit-shaped opening ranges from 5 microns to 20 microns, and a width of the slit-shaped opening ranges from 2.5 microns to one-third of a width of the data line.

6. The liquid crystal display panel according to claim 1, wherein a width of the DBS electrode is greater than a width of the data line.

7. The liquid crystal display panel according to claim 1, wherein two adjacent DBS electrodes are connected by a bridge wire, and the DBS electrode and the bridge wire are disposed on a same level layer.

8. The liquid crystal display panel according to claim 7, wherein the color filter substrate further comprises a common electrode, and the common electrode and the DBS electrode have a same electric potential.

9. A liquid crystal display panel, comprising:
   a color filter substrate;
   an array substrate disposed opposite to the color filter substrate, wherein the array substrate comprises a plurality of data lines and a plurality of data line black matrix less (DBS) electrodes disposed above the data lines; and
   a liquid crystal layer interposed between the color filter substrate and the array substrate, wherein each of the plurality of DBS electrodes comprises at least one slit-shaped opening disposed at intervals along a length side of the DBS electrode, and the slit-shaped opening extends along a wide side of the DBS electrode, wherein the slit-shaped opening is a closed-shaped opening comprising a top wall, a bottom wall, and two opposite sidewalls, the top wall is distanced from a top surface of the DBS electrode, and the bottom wall is distanced from a bottom surface of the DBS electrode.

10. The liquid crystal display panel according to claim 9, wherein a black matrix is disposed on a side of the color filter substrate facing the array substrate, and the black matrix covers the slit-shaped opening corresponding the black matrix.

11. The liquid crystal display panel according to claim 10, wherein a width of the black matrix is greater than or equal to a width of the data line.

12. The liquid crystal display panel according to claim 10, wherein at least one orthographic projection of the slit-shaped opening on the data line is located on a center line in an extending direction of the data line.

13. The liquid crystal display panel according to claim 9, wherein the slit-shaped opening comprises a rectangular shape.

14. The liquid crystal display panel according to claim 13, wherein a length of the slit-shaped opening ranges from 5 microns to 20 microns, and a width of the slit-shaped opening ranges from 2.5 microns to one-third of a width of the data line.

15. The liquid crystal display panel according to claim 9, wherein a width of the DBS electrode is greater than a width of the data line.

16. The liquid crystal display panel according to claim 9, wherein a pixel electrode is disposed on the array substrate, and the DBS electrode and the pixel electrode are disposed on a same level layer.

17. The liquid crystal display panel according to claim 9, wherein two adjacent DBS electrodes are connected by a bridge wire, and the DBS electrode and the bridge wire are disposed on a same level layer.

18. The liquid crystal display panel according to claim 17, wherein the color filter substrate further comprises a common electrode, and the common electrode and the DBS electrode have a same electric potential.

* * * * *